US010544780B2

(12) United States Patent
Gupta et al.

(10) Patent No.: US 10,544,780 B2
(45) Date of Patent: Jan. 28, 2020

(54) METHOD FOR CONTROLLING A WIND POWER PLANT AND A WIND POWER PLANT (71) Applicant: Vestas Wind Systems A/S, Aarhus N. (DK)

(72) Inventors: Manoj Gupta, Singapore (SG); Amit Kumar Gupta, Singapore (SG); Dilip Kumar Guru, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 65 days.

(21) Appl. No.: 15/031,044

(22) PCT Filed: Sep. 26, 2014

(86) PCT No.: PCT/DK2014/050306
§ 371 (c)(1),
(2) Date: Apr. 21, 2016

(87) PCT Pub. No.: WO2015/058769
PCT Pub. Date: Apr. 30, 2015

(65) Prior Publication Data
US 2016/0245259 A1 Aug. 25, 2016

(30) Foreign Application Priority Data

Oct. 21, 2013 (DK) .................... 2013 70598

(51) Int. Cl.
*F03D 9/00* (2016.01)
*F03D 7/04* (2006.01)
(Continued)

(52) U.S. Cl.
CPC ........... *F03D 7/048* (2013.01); *F03D 7/0284* (2013.01); *F03D 7/043* (2013.01); *F03D 9/255* (2017.02);
(Continued)

(58) Field of Classification Search
CPC ................. F03D 9/005; F03D 7/048
See application file for complete search history.

(56) References Cited

U.S. PATENT DOCUMENTS

2010/0312410 A1* 12/2010 Nielsen .................. F03D 7/028
700/287
2012/0147637 A1* 6/2012 Petter ....................... H02J 3/24
363/74
(Continued)

FOREIGN PATENT DOCUMENTS

DE 102011112025 A1 2/2013
EP 2270331 A2 1/2011
(Continued)

OTHER PUBLICATIONS

European Patent Office, International Search Report and Written Opinion issued in International Application No. PCT/DK2014/050306 dated Dec. 18, 2014.
(Continued)

*Primary Examiner* — Viet P Nguyen
(74) *Attorney, Agent, or Firm* — Wood Herron & Evans LLP (57) ABSTRACT A method for controlling a wind power plant, the wind power plant including a plant controller for controlling a plurality of wind turbine generators. The method for controlling a wind power plant allows the wind power plant to continue operating through a grid fault in a weak grid environment. In the method, a fault recovery process is carried out with a wind turbine power controller during a wind turbine fault recovery state to determine a grid voltage (VWTG), compare the grid voltage to a predetermined reference voltage (Vref) to obtain a difference value, and determine a current reference (QrefVC) based on the difference value for generating a reactive current (Idref) for
(Continued)

regulating the grid voltage to the predetermined reference grid voltage. A corresponding wind power plant is further provided.

16 Claims, 6 Drawing Sheets

(51) Int. Cl.
| | | |
|---|---|---|
| *H02J 3/24* | (2006.01) | |
| *H02H 7/30* | (2006.01) | |
| *H02P 9/00* | (2006.01) | |
| *H02J 3/12* | (2006.01) | |
| *H02J 3/38* | (2006.01) | |
| *F03D 7/02* | (2006.01) | |
| *H02J 3/16* | (2006.01) | |
| *F03D 17/00* | (2016.01) | |
| *F03D 9/25* | (2016.01) | |
| *H02H 7/06* | (2006.01) | |
| *H02P 9/10* | (2006.01) | |

(52) U.S. Cl.
CPC .............. *F03D 9/257* (2017.02); *F03D 17/00* (2016.05); *H02H 7/067* (2013.01); *H02H 7/30* (2013.01); *H02J 3/12* (2013.01); *H02J 3/16* (2013.01); *H02J 3/24* (2013.01); *H02J 3/38* (2013.01); *H02J 3/386* (2013.01); *H02P 9/006* (2013.01); *H02P 9/10* (2013.01); *H02J 2003/388* (2013.01); *Y02E 10/763* (2013.01); *Y02E 40/34* (2013.01)

(56) References Cited

U.S. PATENT DOCUMENTS

| | | | | |
|---|---|---|---|---|
| 2012/0150524 A1* | 6/2012 | Nielsen | .................. | H02J 3/386 |
| | | | | 290/44 |
| 2012/0248772 A1* | 10/2012 | Shigemizu | ................ | H02P 9/04 |
| | | | | 290/44 |
| 2013/0175870 A1* | 7/2013 | Fortmann | ................ | H02J 3/18 |
| | | | | 307/84 |
| 2013/0241201 A1* | 9/2013 | Fortmann | ................ | H02J 3/26 |
| | | | | 290/44 |
| 2014/0062085 A1* | 3/2014 | Larsen | .................... | F03D 9/005 |
| | | | | 290/44 |

FOREIGN PATENT DOCUMENTS

| | | | |
|---|---|---|---|
| EP | 2463979 A1 | 6/2012 | |
| WO | 2010002402 A1 | 1/2010 | |
| WO | 2011120523 A2 | 10/2011 | |
| WO | WO 2011154319 A2 * | 12/2011 | ................ H02J 3/26 |
| WO | 2012062327 A2 | 5/2012 | |

OTHER PUBLICATIONS

Danish Patent and Trademark Office, Search Report issued in Application No. PA 2013 70598 dated Jun. 19, 2014.

* cited by examiner

METHOD FOR CONTROLLING A WIND POWER PLANT AND A WIND POWER PLANT

TECHNICAL FIELD

The present disclosure describes embodiments generally relating to a method for controlling a wind power plant and a wind power plant.

BACKGROUND

The development and acceptance of wind energy as a clean and productive source of alternative energy is proliferating. Wind energy can be captured by a wind turbine generator, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbine generators may be arranged together to form a wind park or wind power plant.

Wind power plants are coupled to an electrical network or a power grid. In some situations, wind power plants are situated in rural areas, and infrastructure is sometimes inadequately set up to support the wind power plant electrical distribution. As a result, such transmission grids which are far from the main generation units experience a phenomenon known as "weak grid". The fault level at the Point of Connection (PoC) for a weak grid connected plant is low and Short Circuit Ratio (SCR) at the PoC is defined as SCR=(Fault level in MVA at the PoC)/(MW rating of the Wind power plant). In a weak grid, the SCR is generally less than 3.

A weak transmission grid or electrical grid or power grid or network grid is characterized by high grid impedance due to the low fault level. In a weak grid, it is typically necessary to take voltage level and fluctuations into account because there is a probability that the values might exceed the requirements in the standards when load and production cases are considered. Where a wind energy plant or a wind power plant is connected or coupled to a weak grid, due to the higher impedance of the grid, the amount of wind energy that can be pushed into the grid at the point of connection is limited because of a relatively large fluctuation of the voltage. Further, during normal operation, voltages in a weak grid can exceed the upper continuous operating voltage of the grid.

Transmission grids are typically governed by grid codes which regulate all power generating devices coupled to the grid for normalized operation. Wind power plants which are coupled on to a power grid fall under such regulation and are required to perform accordingly to a number of scenarios, one of which is that of staying connected to the grid during a fault event, for example, a low voltage fault event, and to contribute to the recovery of the power grid.

In a low voltage fault or a voltage dip event, the wind power plant is required to provide a reactive current contribution to support the grid voltage, as according to various grid codes. In certain grid codes, a generating plant connected to the transmission grid must maintain reactive current voltage support even after the grid voltage has returned to the normal continuous operating voltage band. For most grid code regulations, the normal continuous operating voltage band is from 0.9 pu to 1.1 pu.

In voltage dip occurrences in weak grids, and in an instance where a wind power plant is connected to the transmission grid, the wind power plant is expected to similarly provide a reactive current support in assistance to grid voltage recovery. Typically, a predetermined reactive current injection curve is provided for the provision of reactive current by a wind turbine generator or a wind power plant during the voltage dip. In situations where a recovery of a grid voltage is successful, the grid voltage of the transmission grid returns back to a reference voltage band of normal operation. However, according to various grid codes, reactive current support to the transmission grid is to continue even after the grid voltage recovers. It is in such a recovery situation, where for a weak grid, additional reactive current support can cause the wind turbine generator to trip due to exceeding a high voltage limit and if reached to the full active power generation enter a re-triggering loop due to voltage drop at the grid side.

There is as such a desire for a method for controlling a wind power plant operating in a weak grid environment which can continue to be connected to and supporting the grid through a grid fault occurrence.

SUMMARY

According to various embodiments, there is provided a method for controlling a wind power plant including a plant controller for controlling a plurality of wind turbine generators, the method including: detecting a deviation in grid voltage from a defined operation range, the deviation indicating a grid fault, and changing a wind power plant operational state from a normal operation state to a fault ride through state; changing the wind power plant operational state to a fault recovery state when the grid voltage returns to within the defined operation range; and operating a wind turbine power controller in each of the plurality of wind turbine generators to carry out a fault recovery process during the fault recovery state, the fault recovery process including: determining the grid voltage; comparing the grid voltage to a predetermined reference voltage to obtain a difference value; and determining a current reference based on the difference value for generating a reactive current for regulating the grid voltage to the predetermined reference grid voltage.

According to various embodiments, there is provided a wind power plant including a plant controller, the plant controller including: a grid voltage sensor at a point of coupling to a power grid, configured to detect a deviation in grid voltage from a defined operation range, the deviation indicating a grid fault; a state controller configured to change a wind power plant operational state from a normal operation state to a fault ride through state upon indication of a grid fault, and to a fault recovery state when the grid voltage returns to within the normal operation range; the wind power plant further comprising a plurality of wind turbine generators, each of the plurality of wind turbine generators including: a wind turbine power controller configured to operate each of the plurality of wind turbine generators to carry out a fault recovery process during the fault recovery state, the wind turbine power controller including: a turbine voltage sensor configured to determine the grid voltage; a summation module configured to compare the grid voltage to a predetermined reference voltage to obtain a difference value; a voltage control current reference module configured to determine a current reference based on to the difference value for each of the plurality of wind turbine generators to generate a reactive current for regulating the grid voltage to the predetermined reference grid voltage According to various embodiments, there is provided at least one computer program product directly loadable into the internal memory of at least one digital computer, or into a non-transitory computer storage medium of at least one computer, comprising software code portions for performing, when said at least one product is/are run on said at least one computer, the steps of a method for controlling a wind power plant comprising a plant controller for controlling a plurality of wind turbine generators, the method including: detecting a deviation in grid voltage from a defined operation range, the deviation indicating a grid fault, and changing a wind power plant operational state from a normal operation state to a fault ride through state; changing the wind power plant operational state to a fault recovery state when the grid voltage returns to within the defined operation range; and operating a wind turbine power controller in each of the plurality of wind turbine generators to carry out a fault recovery process during the fault recovery state, the fault recovery process including: determining the grid voltage; comparing the grid voltage to a predetermined reference voltage to obtain a difference value; and determining a current reference based on the difference value for generating a reactive current for regulating the grid voltage to the predetermined reference grid voltage.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which.

DETAILED DESCRIPTION

Embodiments of a method for controlling a wind power plant and a wind power plant are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a consumer electronic device which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the recording medium or a system or apparatus or product incorporating the recording medium.

A computing system or a controller or a microcontroller or any other system providing a processing capability can be presented according to various embodiments in the present disclosure. Such a system can be taken to include a processor. A wind power plant and a wind turbine generator operating in the wind power plant according to various embodiments can include a controller which may include a memory which is for example used in the processing carried out by the wind power plant controller and/or the wind turbine controller. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to various embodiments in the present disclosure and may encompass a "circuit" as above, or may be understood to be any kind of a logic-implementing entity therefrom. Further, a module can be called, or may be in the form of, a unit, means, device or equipment.

Figure 1:
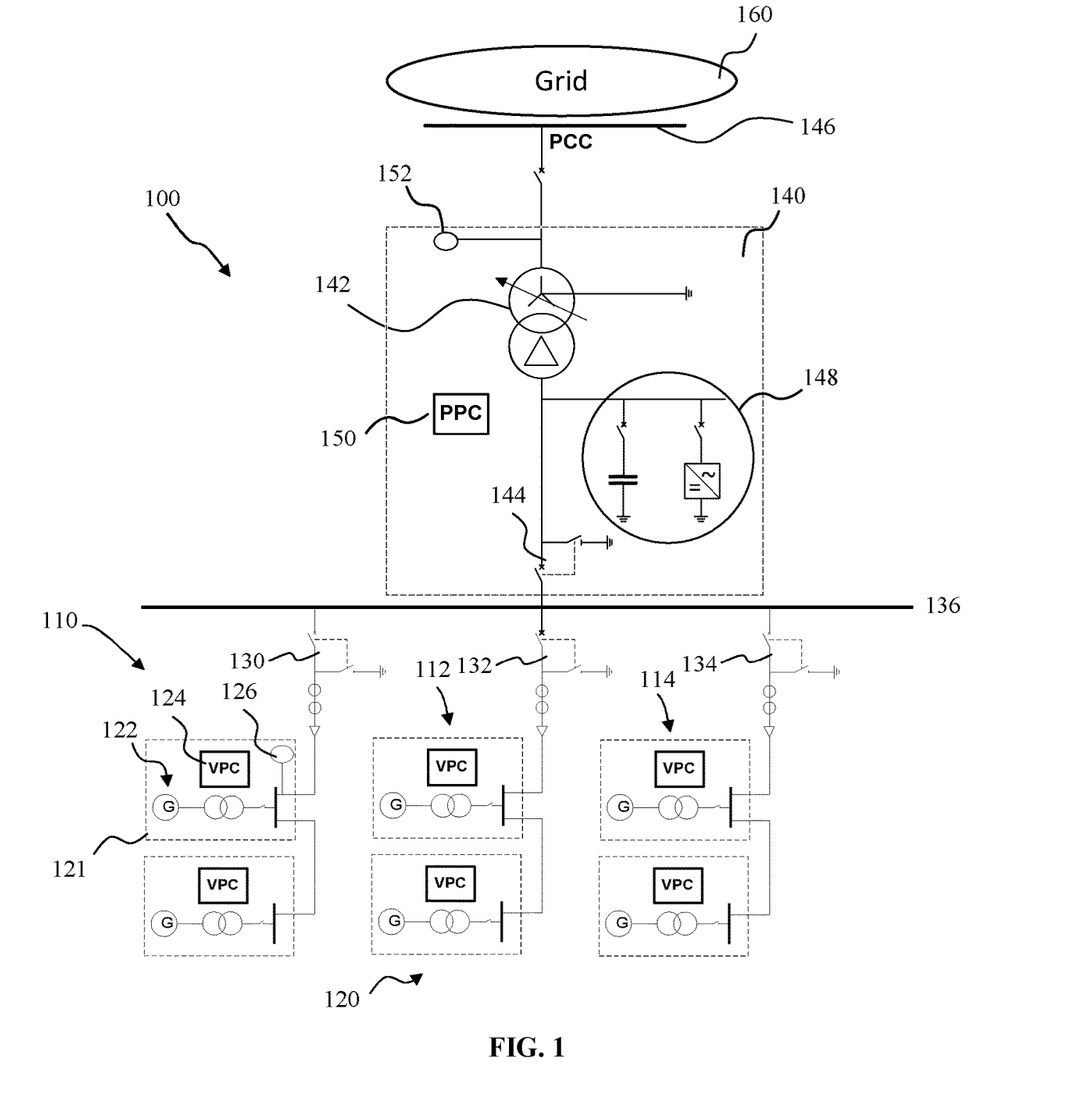
FIG. 1 illustrates a wind power plant according to an embodiment.

FIG. 1 illustrates a wind power plant according to an embodiment. In an embodiment, wind turbine plant or a wind power plant 100, is provided. A wind power plant is typically formed as a collection of wind generation units, or wind turbine generators, such that control is centralized and a single coupling is made to a transmission grid.

In an embodiment, wind power plant 100 includes a plurality of transmission branches 110, 112, 114, each including a plurality of wind turbine generators, or wind turbines, 120 electrically connected to a corresponding transmission branch. In an embodiment, the wind power plant 100 includes a fleet of similar wind turbine generators 120. Wind turbine generator 121 is used as a reference in the present disclosure for a description which can apply to the plurality if wind turbine generators 120. In other embodiments, it is possible to have a variety of wind turbine generators connected to the transmission branches in the wind power plant. This is as wind turbine generators are typically geographically distributed at various locations where prevailing winds would be better utilized by different types of wind turbine generators. In an embodiment, there are two wind turbines connected to transmission branches 110, 112, 114. However, there are typically no guidelines as to the number of wind turbines per transmission branch, simply by preference of physical location.

Each transmission branch 110, 112, 114 is coupled to a plant distribution line 136, which may also be known as a main bus bar, by a transmission branch circuit breaker 130, 132, 134. The function of the transmission branch circuit breaker is to protect both the wind turbines connected to the transmission branch and the other portions of the wind power plant from power surges or spikes which might take place when there is a fault in the transmission grid or in the plant. In such an instance, the circuit breaker trips into an open circuit condition, and isolates the transmission branch from the wind power plant, until the fault is identified and addressed, and the electrical system is back in order for the reconnection of the transmission branch.

On the opposing side of the plant distribution line 136 is provided a plant substation 140. Plant substations can either be a physical area of the wind power plant or an aggregated number of features spread over the plant. In an embodiment, the substation 140 is presented as being located in one physical area. According to the embodiment, the main components of the substation 140 are the main transformer 142, which steps up generated power in the plant to an appropriate voltage to be provided to a transmission grid 160, and the main switchgear 144, which defines an active switch for the wind power plant. The plant substation 140 sits in between the transmission branches 130, 132, 134 of the wind power plant 100 and the point of common coupling 146 to the transmission grid 160.

According to an embodiment, some power compensation equipment 148 is located together with the plant substation 140. In an embodiment, the power compensation equipment 148 includes a number of static synchronous compensators (STATCOMs), but other alternatives could also be possible, such as: switched capacitor banks, switched inductor banks, static condensers, and synchronous condensers. The power compensation equipment 148 is used to control the power factor, the level of reactive power contributed, or the voltage level of the point of common coupling 146. In other embodiments, the power compensation equipment could be distributed to and located at each wind turbine generator 120.

Operation of the wind power plant 100 is controlled by a plant power controller ("PPC") 150 that dispatches various reference set points to individual wind turbine generators 120 in the wind power plant 100. The plant power controller 150 also receives multiple sources of measurements or output readings from each wind turbine generator 120, as well as from various locations on the transmission branches 110, 112, 114, the distribution line 136, the plant substation 140, and the transmission grid 160, and uses the information received to optimize the wind power plant fault current contribution to the transmission grid. The plant power controller 150 can also receive set points for operation from the grid operator of the transmission grid 160 the wind power plant 100 is coupled to.

According to an embodiment, the PPC 150 of the wind power plant 100 is part of a supervisory control and data acquisition (SCADA) network coupling the plant 100 and the plurality of wind turbine generators 120 in the plant 100 to a remote data and control center. The plant SCADA network can include data transmission coupling between plant and turbine controllers provided by a laid fiber optic transmission.

In an embodiment, a sensor 152 is provided at the point of common coupling 146, and the resultant output is provided to the PPC 150 for monitoring of electrical characteristics of the transmission grid 160. A voltage and current characteristic can be monitored, and post-processed to various useful characteristic formats by the PPC 150.

Wind turbine generator 121 can include a plurality of rotor blades driving a rotating main shaft which is mechanically coupled to a gearbox which steps up the rotation for a high-speed generator shaft of a power production system 122. In an embodiment, the power production system 122 includes a doubly fed induction generator (DFIG in which the generator shaft is coupled to the generator rotor or Type3). In an embodiment, the generator is a Full Converter Generator (Type4) generator. The Type4 generator is coupled to a full scale power converter. The method as described in embodiments of the present disclosure is applicable to both Type3 and Type4 machine. In the doubly fed induction generator, mechanical torque is converted into electrical power, which is thereafter provided to a frequency converter for power conditioning. The output of the frequency converter is stepped up with a transformer provided in the turbine, which subsequently produces electrical power rated at 30 kV (it can be any voltage rating from 10 kV to 35 kV) to the transmission branch 110. In various embodiments, the transformer can step the electrical power up to a voltage rating of from 10 kV to 35 kV.

In other embodiments, the turbines in the plant can include a power production system including a generator which can be a singly-fed synchronous generator, an induction generator, a permanent magnet generator or any other type of generator including a stator winding. Further, turbines in other embodiments can include a power production system including direct drive or other alternative drive systems, which eliminate the use of a traditional gearbox. Any wind turbine power production system electrical configuration can be possible in satisfying the purpose of electrical power generation from kinetic wind capture.

According to an embodiment, in normal operation, wind turbine generator 121 receives a power reference from the PPC 150 such that a controlled output of electrical power is generated. The power references generated by the PPC 150 depends on the grid operating condition as experienced by the grid 160 operator, as well as the presently experienced wind for energy conversion. In an embodiment, the power reference from the PPC 150 can be provided as an active power reference P* and a reactive power reference Q*, indicating to the wind turbine generator 121 as the required amount of power to be generated and supplied by the wind turbine generator 121 as part of the wind power plant's contribution to the transmission grid 160. In an embodiment, the power reference from the PPC 150 can also be a power factor reference, which can be defined as the ratio of the real power to the load, to the apparent power in the circuit, i.e. the ratio of active power to the reactive power.

In an embodiment, wind turbine generator 121 includes a wind turbine controller (not shown). The wind turbine controller includes control capabilities for controlling various aspects of wind turbine functionality, for example, wind capture optimization in nacelle yaw and blade pitch capabilities, emergency procedures such as emergency brake or turbine shutdown, or electrical production control. In various embodiments, the wind turbine controller is configured to maximize power production, whilst preventing damage to the wind turbine or to the load.

In an embodiment, the wind turbine controller can include a wind turbine power controller 124. The wind turbine power controller 124 can be provided with processing power, such as with computers, microprocessors, microcontrollers, digital signal processing (DSP) boards, Application Specific Integrated Circuits (ASICs) or any others, and with accompanying appropriate memory modules or any non-transitory computer-readable storage medium.

The wind turbine power controller 124 is provided for the supervision of the power production capability of the wind turbine generator 121. In various embodiments, the wind turbine power controller 124 is coupled to the PPC 150 and receives from the PPC an active power reference P* and a reactive power reference Q* for a provision requirement of the wind turbine generator 121 to the plant 100. Further, the wind turbine power controller 124 is coupled to and is constant communication with the wind turbine controller. In various embodiments, information regarding the control of the wind turbine generator 121 is provided to the wind turbine controller for executing, and sensor information is provided to the wind turbine power controller 124 for use in optimizing power generation by the wind turbine generator 120. Under normal operating conditions the turbine will follow the P* and Q* reference from the PPC.

In an embodiment, the wind turbine power controller 124 is coupled to a voltage sensor 126 configured to take an electrical voltage measurement at the point of coupling of the wind turbine generator 121 to the wind power plant 100. In an embodiment, the voltage sensor is configured to take an electrical voltage measurement at the point of coupling of the wind turbine generator 121 to transmission line 110 as part of the wind power plant 100. The wind turbine power controller 124 receives an output of the voltage sensor 126, which reflects a voltage of the transmission line 110 of the wind power plant 100, which is also a representation of the grid voltage of the transmission grid 160 as coupled with the wind power plant 100.

Each of the wind turbine generators 120 in the wind power plant 100 similarly includes a voltage sensor input, the voltage sensor configured to take an electrical voltage measurement at the point of coupling of each of the plurality of wind turbine generators 120 to a transmission line of the wind power plant. Each voltage sensor would provide an individual reading to a wind turbine power controller provided in each of the plurality of wind turbine generators 120 in the wind power plant. Although a reflection of the grid voltage as coupled to the transmission grid 160, each voltage sensor would provide a slightly different reading in view of the different physical electrical characteristics, such as impedance, capacitance and inductance of each measuring location to the point of common coupling 146.

In an embodiment, a voltage sensor is provided on each of the transmission lines 110, 112, 114 of the wind power plant. Such a voltage sensor registers and monitors electrical voltage characteristics of the wind power plant at each transmission line and provides an output reading to each of the wind turbine generators coupled to the transmission line. Such an arrangement might be suitable for when the transmission line includes wind turbine generators relatively close to one another, thereby allowing for a minimal lag time in data transmission, as well as only slight deviation in physical electrical transmission variation.

Figure 2:
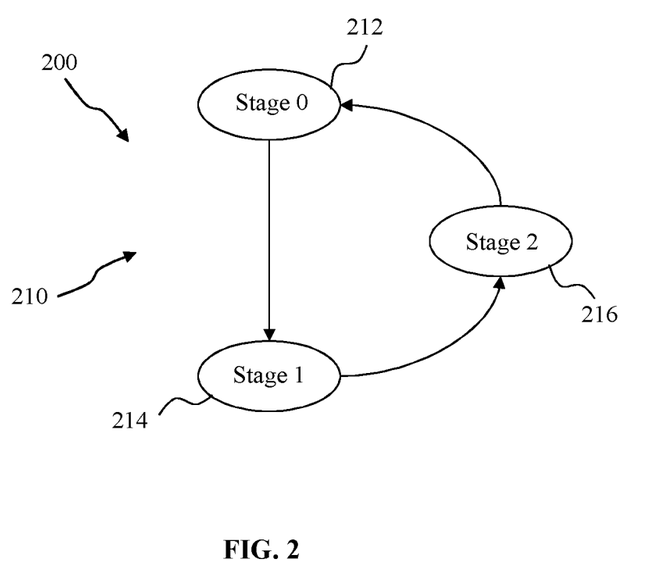
FIG. 2 illustrates a state model according to a state machine of an embodiment.

According to an embodiment, the PPC 150 can include a state module or a state controller or a state machine 200. FIG. 2 illustrates a state model according to a state machine 200 of an embodiment. In an embodiment, the state machine 200 can be provided for the operation of various power generation capabilities within the wind power plant 100. In an embodiment, the state machine 200 can be provided for controlling a wind power plant operational state, which can determined the operational state of the wind turbine generators 120 in the wind power plant. In other embodiments, the state machine 200 can be coupled to a wind turbine selector module, such that only selected wind turbine generators in the wind power plant 100 respond to changes in the state machine 200.

In an embodiment, the wind turbine power controller 124 can include a state machine which can reflect the state machine 200 of the PPC 150. As indicated above, the wind turbine power controller of each wind turbine generator is coupled to the PPC 150 with a fiber optic data transmission connection, which can provide for an effectively instantaneous updating of the wind turbine state machine, when a change in state is carried out in the state machine 200 of the PPC 150. Similar state models can be provided in the state machine at the PPC 150 and the state machines at individual wind turbine generators for streamlined operation.

In an embodiment, the state machine 200 provides a state model 210 relating to a fault handling process. In an embodiment, the state model 210 is provided for handling a low voltage grid event or a grid voltage dip event, where the grid voltage drops below a reference level to a low voltage fault level.

Figure 3:
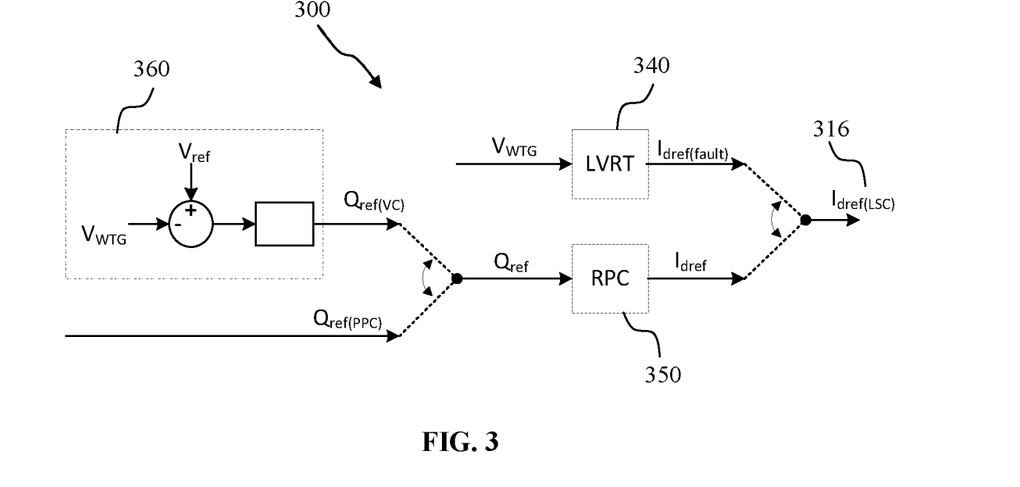
FIG. 3 illustrates a schematic representation of current generation in the wind turbine generator according to an embodiment.

FIG. 3 illustrates a schematic representation of current generation in the wind turbine generator according to an embodiment. In an embodiment, current generation schematic representation 300 generally depicts how wind turbine generator 121 generates and provides a resultant electrical current for provision to a transmission grid 160. Schematic representation 300 provides various pathways of how wind turbine generator 121 can provide a current injection. Schematic representation 300 can be further broken down, and is described in accordance with a corresponding state in the state model 210 of the state machine 200 of FIG. 2.

Schematic representation 300 includes two main processing blocks—LVRT 340 and RPC (Reactive Power Controller) 350. Processing blocks RPC 350 and LVRT 340 are hosted on wind turbine power controller 124 and are responsible for receiving a particular input and generating an electrical current with the wind turbine power production system. Typically, after processing is complete within processing blocks RPC 350 and LVRT 340, the desired current reference is provided to a current control block or a current controller or current control module, which thereafter provides a voltage reference for the control of the power production system 122 or the frequency converter of the power production system 122. Prior to being provided to the power production system 122, a pulse-width modulation (PWM) modulator carries out a modification of the voltage reference to appropriate switching indications and instructions for the control of the frequency converter, and the output of the PWM modulator is thereafter provided for operation of various electrical switches in the frequency converter. A resultant reactive current is thereafter provided as an output of the wind turbine generator 120.

In an embodiment, the state model 210 includes a State 0 212, which relates to a state governing normal or typical operation for the wind power plant 100. In State 0 212, the wind power plant receives set points from the grid operator, if any, and provides resultant power references to the wind turbine generators 120 coupled to the wind power plant 100. State 0 212 typically can include a situation where functionality of the transmission grid 160 is provided at a regular reference state, for example, grid frequency and grid voltage of the transmission grid 160 is within a reference frame. In an embodiment, the transmission grid 160 can have a reference grid frequency of about 50 Hz±0.5 Hz, and a reference grid voltage of about 1.0 p.u.±10%. Grid characteristics falling within such a reference can be considered normal operation.

According to various embodiments, in normal operation, the wind power plant 100 generally seeks to provide its rated power to the transmission grid 160. Rated power can be understood to be the maximum power which can be delivered for the plant when an incident wind is in the ideal range at a wind turbine generator for energy conversion.

Figure 3A:
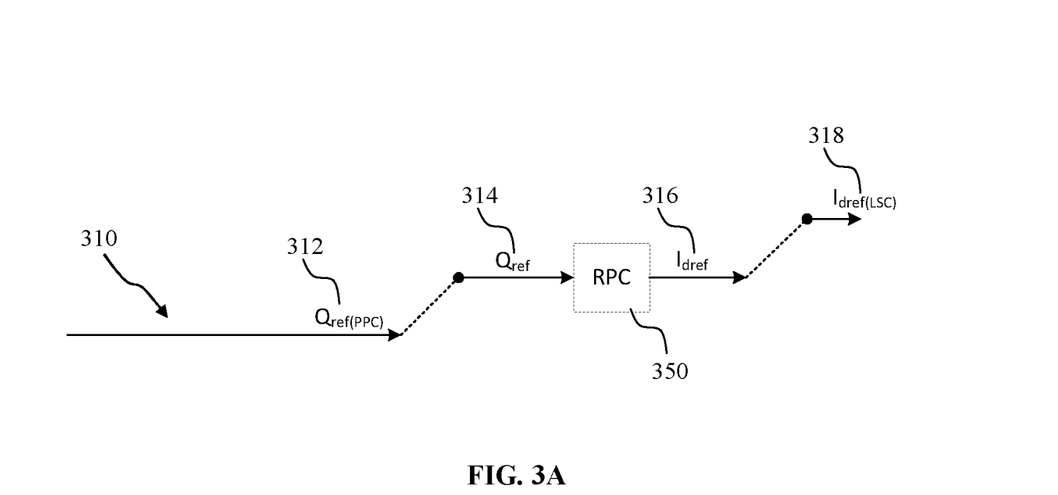
FIG. 3A illustrates a schematic representation of current generation in State 0 according to an embodiment.

In FIG. 3A, a schematic representation 310 of current generation in State 0 is provided. In an embodiment, a reactive current reference $Q_{ref(PPC)}$ 312 is received from the PPC 150, which indicates an amount of reactive power the wind turbine generator 121 is to produce, as based on an analysis of grid voltage conditions as well as grid set points provided by the grid operator. The received reactive current reference $Q_{ref(PPC)}$ 312 is thus provided to the wind turbine power controller 121 as a reference for a desired reactive current $Q_{ref}$ 314. In an embodiment, the desired reactive current $Q_{ref}$ 314 is provided to the RPC block 350.

Grid reactive power control block 350 includes a plurality of control modules configured to receive an input reference provided to the block 350, and then carry out processing in order to provide a resultant reactive current reference $I_{dref}$ 316 which is in accordance to the desired reactive current $Q_{ref}$ 314. Reactive current reference $I_{dref}$ 316 is thereafter established as $I_{dref(LSC)}$ 318, which is then provided to a current control block. The current control block provides as output voltage references for controlling the PWM modulator for switching control of the frequency converter in providing the reactive current output at the line side converter.

Returning to FIG. 2, in an embodiment, sensor 152 detects a deviation in grid voltage from a normal defined operation range at the point of coupling 146 to the power grid 160. Such a deviation can indicate a grid fault. In an embodiment, the deviation is a voltage dip below the reference threshold causing a low voltage grid fault. In detecting a grid fault, the PPC 150, or in an embodiment, the state machine 200 in the PPC 150, changes the operating state in the state model 210 from a normal operation state of State 0 212, to a fault ride through state of State 1 214. Such a change in state is correspondingly provided to the wind turbine power controller 124, and in an embodiment, a state machine operating within the wind turbine power controller 124.

According to an embodiment, the change in state is effected upon a condition or a characteristic of the transmission grid 160. In an embodiment, the change in state from State 0 212 to State 1 214 takes place when the grid voltage dips below a reference voltage $V_{dip}$. In an embodiment, the reference voltage $V_{dip}$ is set at the lower threshold of a reference grid voltage for normal operation, for example 0.9 p.u., when the reference grid voltage or normal defined operation range is 1.0 p.u.±10%. In another embodiment, reference voltage $V_{dip}$ is set at 0.85 p.u.

In an embodiment, the wind turbine power controller 124 in a wind turbine controller receives a state change indication from the PPC 150 and enters a fault ride through state. In the fault ride through state, wind turbine generators 120 in the wind power plant are expected to remain connected to the transmission grid, despite a drop in grid voltage. As voltage dips can be caused by too little power generation to the load in the transmission grid, a disconnection of further power generators may cause a further reaction in bringing down the entire transmission grid.

Figure 3B:
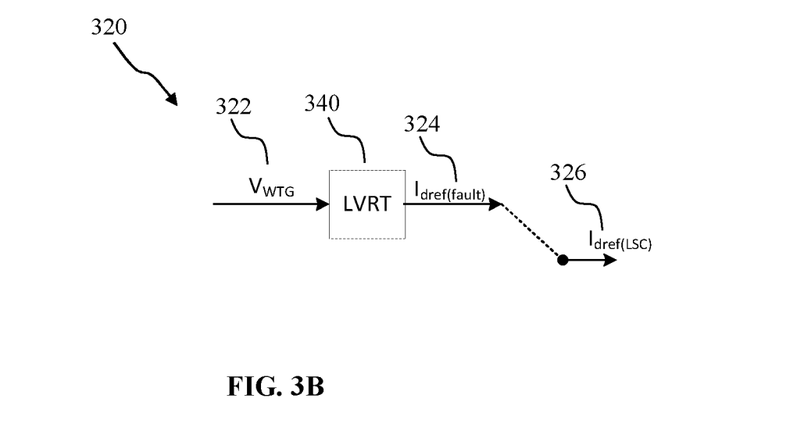
FIG. 3B illustrates a schematic representation of current generation in State 1 according to an embodiment.

FIG. 3B illustrates a schematic representation 320 of current generation in State 1 according to an embodiment. According to an embodiment, in a fault ride through mode, a wind turbine generator 120 is configured to provide an amount of reactive current or reactive power according to a predetermined injection curve, as in agreement between a wind power plant operator and the grid operator. This is further in accordance with the grid voltage during the grid fault. In an embodiment, the wind turbine generator is configured to provide a reactive current part of 1 p.u. of the rated turbine current at the generator terminals during a voltage dip.

In carrying out the fault ride through mode in State 1, the wind turbine generator 121 no longer receives a current reference from the PPC 150, but instead carries out a determination through low voltage ride through (LVRT) block 340 with an input of a grid voltage reading $V_{WTG}$ 322 as received from voltage sensor 126. LVRT block 340 carries out a processing of a reactive current injection, which as mentioned, can relate to a reactive current injection that supports the grid 160 during the fault. LVRT block 340 further carries out processing in order to provide a resultant reactive current reference $I_{dref(fault)}$ 324 to be generated by the wind turbine generator 121. Reactive current reference $I_{dref(fault)}$ 324 is thereafter established as $I_{dref(LSC)}$ 326, which is then provided to a current control block. The current control block provides as output voltage references for controlling the PWM modulator for switching control of the frequency converter in providing the reactive current output at the line side converter.

According to an embodiment, in a low voltage situation, an electrical generator of the wind turbine generator is a doubly fed induction generator, the doubly fed induction generator coupled to a frequency converter for controlling the amount of active and reactive power to be delivered to the transmission grid during the fault ride through state.

Low voltage ride through in wind turbine generators has been taught in various publications and for different variations of wind turbine generators and specifics will not be elaborated in this present disclosure.

In providing a reactive current to the transmission grid, the wind power plant 100 supports the voltage recovery of an transmission grid, from the drop to low voltage during the grid fault to an acceptable operating level, for example the voltage level as defined for that of normal operation earlier. It is also noted that other power generating plants separately connected to the transmission grid at other locations similarly provide a reactive current injection into the grid during a low voltage event, as required in the transmission grid code, further supporting a rise in grid voltage level towards a normal operating voltage.

Returning to FIG. 2, as the voltage continues to rise from the low voltage dip triggering the low voltage ride through State 1 214, in part with assistance from the reactive current injection from the wind power plant 100, the grid voltage passes a reference voltage predetermined as a reference condition for change of state according to the state model 200. According to an embodiment, a condition for wind power plant 100 operation in conjunction with a transmission grid voltage recovery from a voltage dip is provided as where the grid voltage exceeds a voltage dip reference. Such a condition can be provided as $V_{grid} > V_{dip}$. According to another embodiment, the condition can further include a timing factor, for example maintaining a recovery grid voltage for a certain period of time. In an embodiment, a condition for recovery can be provided as $V_{grid} > V_{dip}$, consistently maintained for a period of 50 ms. In various embodiments, the timing factor can be any where from 20 ms or 100 ms or more.

According to an embodiment, upon satisfaction of a predetermined condition, which indicates an initial recovery of the transmission grid voltage, the state machine 200 operating in or on the PPC 150 of the wind turbine generator changes the operating state in the state model 210 from the fault ride through state of State 1 214 to a fault recovery State 2 216. Such a change in state is correspondingly provided to the wind turbine power controller 124, and in an embodiment, a state machine operating within the wind turbine power controller 124.

In a fault recovery state, the wind power plant no longer is required to provide a full output of reactive current. However, multiple grid codes still provide that connected generating plants should continue to provide recovery support for a further period of time, typically about 500 ms. In various embodiments, the plants provide recovery support for a further 250 ms or 1000 ms or any other value.

According to an embodiment, in fault recovery State 2 214, wind power plant 100 operates each wind turbine generator 120 to independently generate an electrical power. In such a case, wind turbine generator 121, as with the other wind turbine generators in the wind power plant 100, receives an instruction from the PPC 150 to carry out a fault recovery process. Alternatively, wind power plant 100 can operate a plurality of wind turbine generators to independently generate an electrical power, and operate at least one other wind turbine generator based off a control determined at the PPC.

The instruction is provided to the wind turbine power controller 124 of the wind turbine generator 121 when the state machine 200 carries out the change in state to State 2 214. In an embodiment, when the state machine operating within the wind turbine power controller 124 receives a change in state instruction from the state machine 200 in the PPC 150 to State 2 216, the wind turbine power controller 124 is configured to carry out a fault recovery process.

Figure 3C:
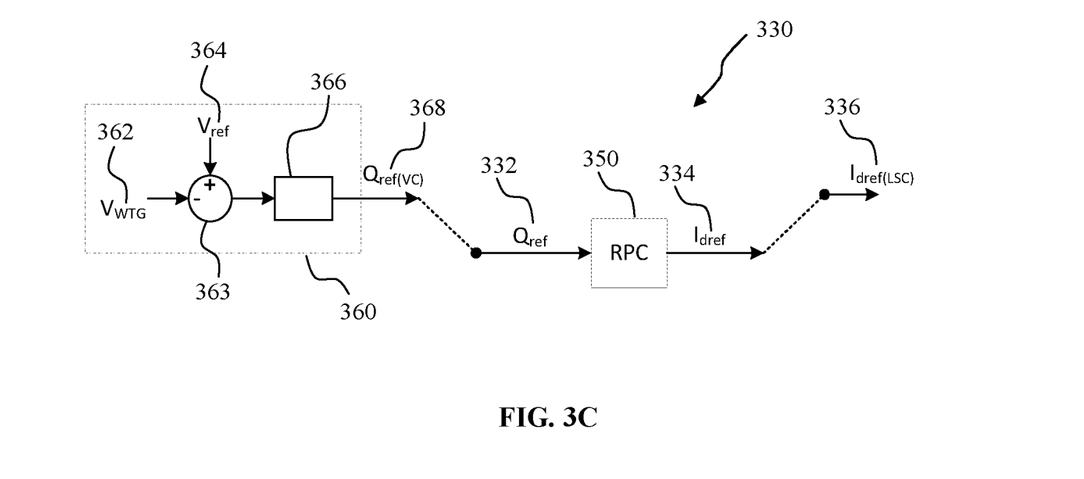
FIG. 3C illustrates a schematic representation of current generation in State 2 according to an embodiment.

In an embodiment, the wind turbine power controller 124 of the wind turbine generator 121 carries out a fault recovery process upon indication by the PPC 150. FIG. 3C illustrates a schematic representation 330 of current generation in State 2 according to an embodiment. Wind turbine power controller 124 can include a fault recovery module 360 operating within the wind turbine power controller 124.

The wind turbine power controller 124 receives an input $V_{WTG}$ 362 from the voltage sensor 126 coupled to the wind turbine generator 121. The reading from the voltage sensor 126 provides an indication of the present grid voltage of the transmission grid and is used by the fault recovery module 360 in the fault recovery process.

In an embodiment, the voltage obtained from the voltage sensor 126—$V_{WTG}$ 362 is provided to a summation module 363 and subtracted from a predetermined reference voltage $V_{ref}$ 364 in the summation module 363. According to various embodiments, the predetermined reference voltage $V_{ref}$ 364 can be an upper bound of the normal operating range, i.e. about 1.1 pu. In other embodiments, the predetermined reference voltage $V_{ref}$ 364 can be any value in the earlier defined normal operating range, i.e. $0.9\ pu \le V_{ref} \le 1.1\ pu$. The resultant voltage difference from the summation module 363 can be considered a difference value from which a current reference is determined.

According to various embodiments, the difference value can be a voltage difference between a predetermined reference voltage and a measured voltage. In embodiments, the difference value can be a voltage difference between a predetermined reference grid voltage and a measured grid voltage. In an embodiment, the measured grid voltage can be measured by the plant controller. In an embodiment, the measured grid voltage can be measured by a wind turbine power controller. In embodiments, the difference value can be a voltage difference. In embodiments, the difference value can be a difference of electrical characteristics, for example, any of a resistance, an electrical current, a flux, etc.

The resultant voltage difference from the summation module 363 is provided to a reference generator 366. The reference generator 366 is configured to generate a reference for the operation of the wind turbine power production system 122 in generating an electrical output. According to various embodiments, the reference is a current reference indicating the desired amount of current to be provided by the wind turbine generator to the power grid 160. In an embodiment, the reference is a reactive current reference $Q_{ref(VC)}$ 368 indicating the desired amount of reactive current to be provided by the wind turbine generator to the power grid 160.

The reactive current reference $Q_{ref(VC)}$ 368 is thereafter provided to the RPC block 350 as a reference for a desired reactive current $Q_{ref}$ 332. The RPC block 350 then carries out processing in order to provide a resultant reactive current reference $I_{dref}$ 334 which is in accordance to the desired reactive current $Q_{ref}$ 332. Reactive current reference $I_{dref}$ 334 is thereafter established as $I_{dref(LSC)}$ 336, which is then provided to a current control block. The current control block provides as output voltage references for controlling the PWM modulator for switching control of the frequency converter in providing the reactive current output at the line side converter.

The amount of reactive current to be provided by the wind turbine generator 121 to the power grid 160 is provided such as to provide a voltage control function for the wind turbine generator 121. In providing a certain amount of reactive current, the wind turbine generator 121 seeks to alter the grid voltage, such that a predetermined reference voltage or a target reference voltage $V_{ref}$ 364 is achieved. For example, if a positive reactive current reference is generated, the wind turbine generator 121 generates a reactive current for provision to the transmission grid which should correspondingly cause an increase in grid voltage. Such a reactive current provision can also be known as an inductive reactive current. Alternatively, if a negative reactive current reference is generated the wind turbine generator 121 is theoretically configured to absorb a reactive current from the transmission grid which should correspondingly cause a decrease in grid voltage. Such a reactive current provision can also be known as a capacitive reactive current.

Carrying out such a fault recovery process provides flexibility to an electrical power input provided by the wind power plant 100 to the grid 160. Instead of providing a fixed reactive current injection based on a predetermined curve, or a previously generated reactive current reference, the wind power plant provides an injection which seeks to alter the grid voltage to a predetermined reference level, in a way functioning as a voltage controller for the transmission grid.

In a weak grid situation, such a configuration and process is useful in not overloading the weak grid which takes a relatively longer time to stabilize from a current injection and resultant voltage rise. Further, a voltage rise resultant from a current injection can also be unpredictably larger than expected, creating an additional drawback to present methods of handling a fault event in a weak grid.

In tasking individual wind turbine generators to carry out a voltage control task, the present disclosure allows for a quick reacting current injection based on present grid response. The generation of a current injection at the wind turbine generator level saves precious processing and communication time as compared to carrying out a voltage control task at the PPC, and sub-dividing the required current injection to the wind turbine generators in the plant.

In an embodiment, the reference generator 366 is a proportional-integral (PI) controller. A PI controller is used to generate a reference reactive current for an electrical power production by the wind turbine generator 121 in order to minimize the difference value between $V_{ref}$ and $V_{WTG}$. In other embodiments, the reference generator 366 can be a proportional-integral-derivative (PID) controller. In other embodiments, the reference generator can be any one of a proportional resonant controller and a fuzzy logic based controller.

As indicated earlier, according to an embodiment, each wind turbine generator 120 carries out a fault recovery process that results in the provision of a reactive current injection based on voltage control of the grid voltage to a predetermined reference voltage $V_{ref}$. In an embodiment, the predetermined reference voltage is the same amongst all the wind turbine generators and is hardcoded into each wind turbine power controller. In an embodiment, the predetermined reference voltage is determined at the PPC and provided to each wind turbine generator during a change of state to State 2. In an embodiment, the predetermined reference voltage is determined at the PPC for each individual turbine and is provided to each wind turbine generator during a change of state to State 2.

The electrical output of each of the wind turbine generators 120 is provided onto the respective transmission lines 110, 112, 114 of each of the wind turbine generators 120, and subsequently onto the shared distribution line 136 and onto the plant substation 140. There, the combined electrical power for output is stepped up to a high voltage for transmission in and through the transmission grid 160 by the main transformer 142. In accordance to an embodiment, the provided reactive current injection is provided to the grid to alter the grid voltage towards the predetermined reference voltage $V_{ref}$.

Returning to FIG. 2, in an embodiment, the wind power plant 100 operates in State 2 216 for a period of time before returning back to State 0 212. In an embodiment, the state machine carries out a changing from the fault recovery state 216 to a normal operation state 212 upon the satisfaction of an exit condition. In an embodiment, the exit condition is a predetermined fault recovery state time period.

According to various embodiments, the predetermined fault recovery state time period depends on the amount of time required for the at least one wind turbine generator to change to the normal operation state and provide an active power accordingly. In an embodiment, the predetermined fault recovery state time period is based on a guideline that a power producing generator should return to a typical range of active power production within 1 second from the recovery of the grid from the fault. According to various embodiments, the recovery of the grid from the fault can be considered to commence when the state machine 200 changes to State 2 216, i.e. satisfies the condition of $V_{grid} > V_{dip}$, consistently maintained for a period of 50 ms.

According to various embodiments, the power production system 122 includes a DFIG. In such a case, the DFIG requires a slightly longer time as compared with full-scale synchronous generator systems to configure the delivered power in the wind turbine generator, from supporting the voltage dip with a reactive current injection, to providing active power in normal operation depends on the amount of time required for the at least one wind turbine generator to change to the normal operation state and provide an active power accordingly. According to an embodiment, a DFIG power production system 122 remains in State 2 216, or carries a fault recovery process when the state machine is in State 2 216, for about 150 ms. According to another embodiment, a full-scale synchronous generator system remains in State 2 216, or carries a fault recovery process when the state machine is in State 2 216, for about 600 ms. Other timing periods apply for other variations of power production systems, for example a full scale converter based wind turbine generator.

In an embodiment, the exit condition is based on the grid voltage satisfying a target reference voltage at a given tolerance for a predetermined period of time. As compared with carrying out the fault recovery process over a period of time, a monitoring of the grid voltage by the PPC 150 of sensor 152 can be carried out and an exit condition from State 2 216 back to State 0 212 can be based on a stabilization of the grid voltage. In an embodiment, the exit condition can be defined as having the grid voltage $V_{grid} \geq 0.95$ pu for a period of 1 second. In another embodiment, the exit condition can be defined as having the grid voltage $V_{grid} \geq 1.1$ pu for a period of 1 second. In an embodiment, the exit condition can be defined as 0.95 pu $\leq V_{grid} \leq 1.05$ pu for a period of 1 second. In various embodiments, the exit condition includes a stabilization of the grid voltage for a length of time. In embodiments, the length of time can be any where from 1 second to 5 seconds or more. In various embodiments, the exit condition can be defined depending on achieving a stability in the grid voltage of the weak grid.

In satisfying an exit condition of State 2 216, the state machine 200 of the PPC 150 carries out a change of state to State 0 212 governing normal operation for the wind power plant 100 and in connection with a stabilized transmission grid 160. Similarly, an indication is thereafter sent out by the PPC 150 to each wind turbine generator 120 coupled to the wind power plant 100, and particularly to a state machine operating within the wind turbine power controller of each wind turbine generator to change a state thereupon.

In another embodiment, the wind turbine power controller 124 of wind turbine generator 121 carries out a determination of exit condition of State 2, and in arriving at a situation in which the exit condition is satisfied, carries out a change of state to State 0 in the state machine in the wind turbine power controller 124. A corresponding signal is then sent up to the state machine 200 in the PPC 150 to indicate the change in state of wind turbine generator 121.

Having changed state to State 0 212, the PPC 150 of wind power plant 100 generates and sends out power references P* and Q* to each of the coupled wind turbine generators 120 in the wind power plant 100, for generating a power for provision to the transmission grid 160. As can be noted, once the wind turbine generator 120 changes from operating in State 2, particularly operating a fault recovery process in State 2, the wind turbine power controller 124 ceases determining its own current reference and instead operates based on power references received from PPC 150.

In carrying out the fault recovery process with each wind turbine generator, the risk of a wind turbine generator tripping over an over-limit violation is also reduced, as each wind turbine generator is on itself contributing to bringing down any excessive swing in the grid voltage and in stabilizing the transmission grid.

In an embodiment, the transmission grid experiences a high voltage surge fault or a grid swell. Similar to a low voltage event, the wind turbine generator is expected to stay connected to grid and not only ride out the high voltage event, but also to provide a compensatory reactive power in order to stabilize the grid. Such a process can be known as a high voltage ride through (HVRT). As the transmission grid can be a weak grid, a corresponding state model can be provided to achieve the same purpose of allowing a wind turbine generator to adaptively stay connected to a weak grid, while contributing to voltage stability. Various embodiments also include variations to support other kinds of transmission grid faults, such as symmetrical grid faults, asymmetrical grid faults, short circuit faults, etc.

Figure 4:
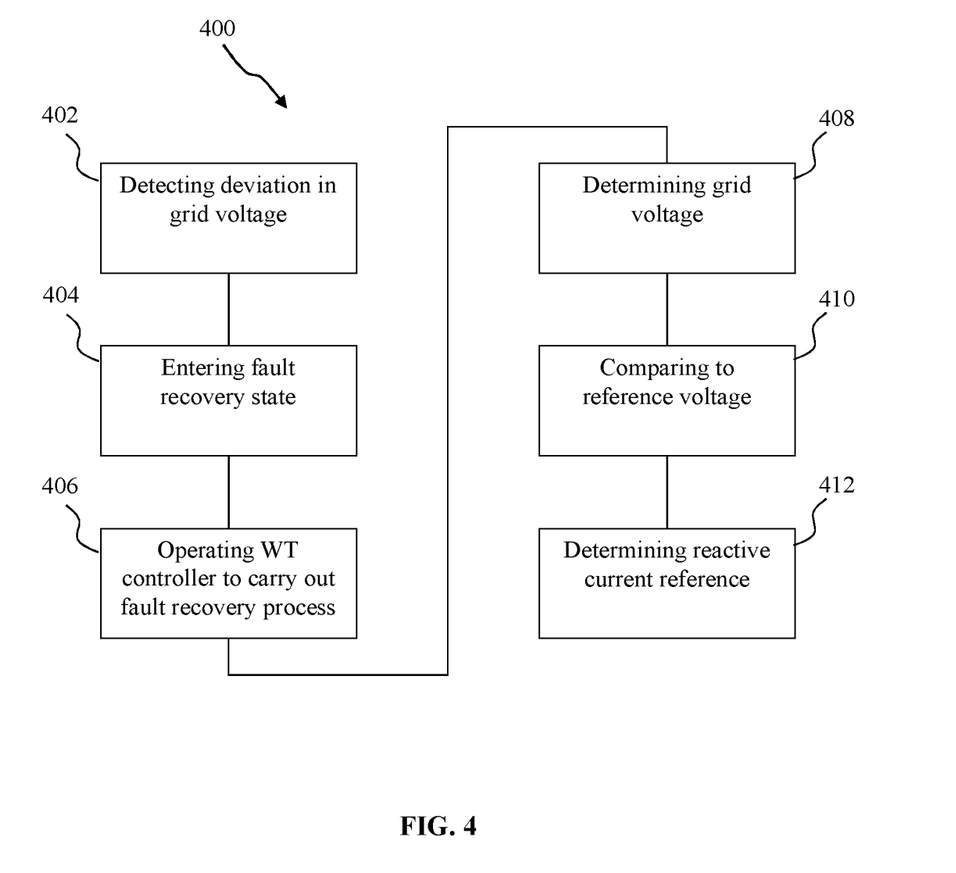
FIG. 4 illustrates a method for controlling a wind power plant according to an embodiment.

FIG. 4 illustrates a method for controlling a wind power plant according to an embodiment. According to an embodiment, method 400 can be a method for controlling a wind power plant, the wind power plant including a plant controller for controlling a plurality of wind turbine generators. In 402, the method can include detecting a deviation in grid voltage from a defined operation range, the deviation indicating a grid fault, and changing a wind power plant operational state from a normal operation state to a fault ride through state. In 404, the method can include changing the wind power plant operational state to a fault recovery state when the grid voltage returns to within the defined operation range. In 406, the method can include operating a wind turbine power controller in each of the plurality of wind turbine generators to carry out a fault recovery process during the fault recovery state.

In 408, the fault recovery process in the method can include determining the grid voltage. In 410, the fault recovery process in the method can include comparing the grid voltage to a predetermined reference voltage to obtain a difference value. In 412, the fault recovery process in the method can include determining a current reference based on the difference value for generating a reactive current for regulating the grid voltage to the predetermined reference grid voltage.

In operating or controlling a wind power plant with such a method, the wind power plant is provided with a capability to comply with grid code requirements, even in weak grid situations. Further, such capability is carried out without need of expensive balance of plant compensation equipment. Typically, such functionality as advantageously provided by the method according to various embodiments can be implemented in existing wind power plants and wind turbine generators through a software upgrade, which is carried out without much complication as compared with additional hardware or equipment installation. Advantageously, such a method opens up additional markets to wind power plants, in seeking to service distance-challenged transmission grid interfaces.

In an embodiment, determining the grid voltage can include determining the grid voltage at a coupling of each of the plurality of wind turbine generators to the wind power plant. Carrying out a determination at a coupling of each of the plurality of wind turbine generators allows each wind turbine power controller a local reading which is responsive and accurately reflects the grid voltage taking into account the physical and electrical characteristics between the wind turbine generator and the point of common coupling to the grid. Each wind turbine generator is thus able to independently operate as a voltage controller in providing a reactive current injection into the grid.

In an embodiment, the reactive current generated by each of the plurality of wind turbine generators can include any one of an inductive reactive current and a capacitive reactive current. In a weak grid environment, voltage fluctuations can be very great. Even in the recovery from a voltage dip, there could be instability, leading to a large voltage swing to past a normal defined operating range. In such a case, allowing a voltage controlled wind turbine generator injection of a capacitive reactive current could bring the voltage to the normal operating range. Alternatively, the instability could also cause the voltage to dip again, in such case, requiring additional inductive reactive current injection.

In an embodiment, the method can further include changing the wind power plant operational state from the fault recovery state to a normal operation state upon the satisfaction of an exit condition. Providing such a feature allows for a controlled transition between states, and is intended to account for the objective of the fault recovery process in stabilizing the grid voltage.

In an embodiment, the exit condition can include a predetermined fault recovery state time period. Providing such an exit condition allows for adherence to various grid requirements in continuing to provide for reactive power support in grid fault recovery.

In an embodiment, the predetermined fault recovery state time period can depend on the amount of time required for each of the plurality of wind turbine generators to change to the normal operation state and provide power accordingly. A wind power plant can include a variation of wind turbine generator models and recovery. Providing a condition which can take into account such variation allows for a better and more efficient adaptation of the wind power plant to grid fault handling.

In an embodiment, the exit condition can be based on the grid voltage satisfying a target reference voltage at a given tolerance for a predetermined period of time. Providing such an exit condition allows for the fault recovery process to continue until a stability of the grid voltage in a weak grid environment is assured.

In an embodiment, the target reference voltage can include the predetermined reference grid voltage. In doing so, the fault recovery process allows for the transmission grid to recover to its prior normal operating state before beginning to provide rated active power in accordance to a normal operating state.

Figure 5:
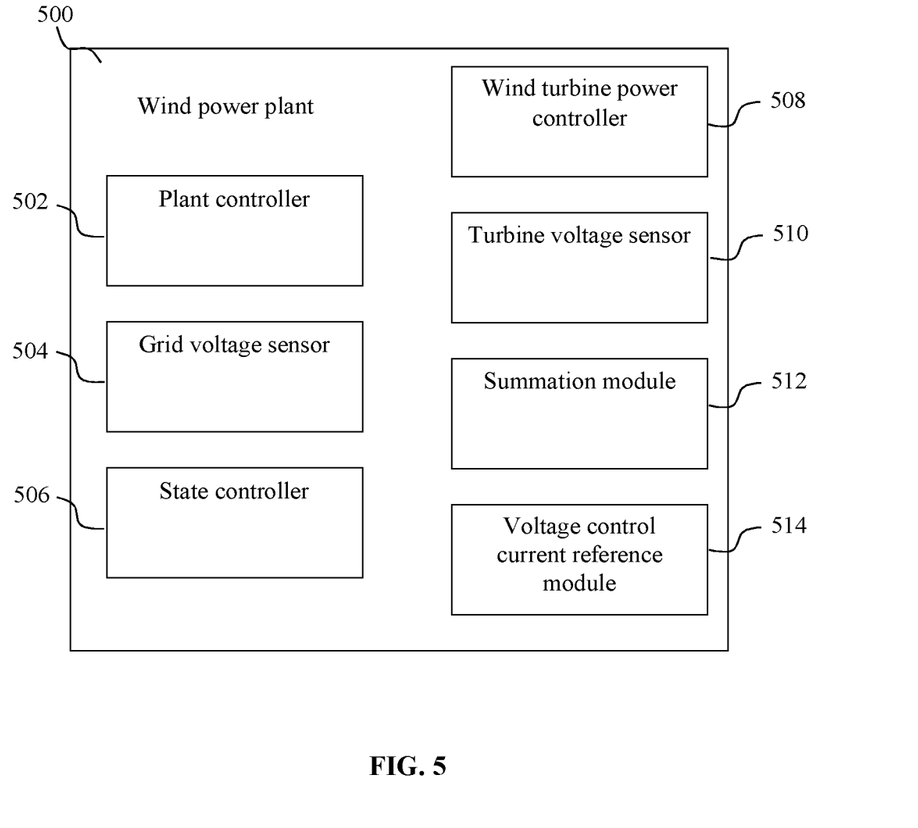
FIG. 5 illustrates a block diagram for a wind power plant according to an embodiment.

FIG. 5 illustrates a block diagram of a wind power plant 500 according to an embodiment. In 502, the wind power plant can include a plant controller. The wind power plant 500 includes a plant controller 502. The plant controller 502 further includes a grid voltage sensor 504 at a point of coupling to a power grid, configured to detect a deviation in grid voltage from a defined operation range, the deviation indicating a grid fault, and a state controller 506 configured to change a wind power plant operational state from a normal operation state to a fault ride through state upon indication of a grid fault, and to a fault recovery state when the grid voltage returns to within the normal operation range.

In the embodiment, the wind power plant 500 can include a plurality of wind turbine generators, each of the plurality of wind turbine generators including a wind turbine power controller 508 configured to operate each of the plurality of wind turbine generators to carry out a fault recovery process during the fault recovery state. The wind turbine power controller 508 can further include a turbine voltage sensor 510 configured to determine the grid voltage. The wind turbine power controller 508 can include a summation module 512 configured to compare the grid voltage to a predetermined reference voltage to obtain a difference value. The wind turbine power controller 508 can also include a voltage control current reference module 514 configured to determine a current reference based on to the difference value for each of the plurality of wind turbine generators to generate a reactive current for regulating the grid voltage to the predetermined reference grid voltage.

According to an embodiment, various features and components in the wind power plant can be implemented in one or more circuits and/or modules operating on either coupled or distinct processors.

In an embodiment, the turbine voltage sensor can be further configured to determine the grid voltage at a coupling of each of the plurality of wind turbine generators to the wind power plant.

In an embodiment, the reactive current generated by each of the plurality of wind turbine generators can include any one of an inductive reactive current and a capacitive reactive current.

In an embodiment, the state controller can be further configured to change from the fault recovery state to a normal operation state upon the satisfaction of an exit condition.

In an embodiment, the exit condition can include a predetermined fault recovery state time period.

In an embodiment, the predetermined fault recovery state time period can depend on the amount of time required for each of the plurality of wind turbine generators to change to the normal operation state and provide power accordingly.

In an embodiment, the exit condition can be based on the grid voltage satisfying a target reference voltage at a given tolerance for a predetermined period of time.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method for controlling a wind power plant comprising a plant controller for controlling a plurality of wind turbine generators, the method comprising:

detecting a deviation in grid voltage from a defined operation range for a grid coupled with the wind power plant that includes the plurality of wind turbine generators, the deviation indicating a grid fault, and changing, through the plant controller, a wind power plant operational state from a normal operation state to a fault ride through state;

the plant controller further changing the wind power plant operational state to a fault recovery state for the wind power plant when the grid voltage returns to within the defined operation range; and operating a wind turbine power controller in each of the plurality of wind turbine generators that are each in communication with the plant controller, the wind turbine power controllers each carrying out a fault recovery process at the direction of the plant controller during the fault recovery state, the fault recovery process independently provided by the wind turbine power controller for each wind turbine generator and comprising:

at each wind turbine generator of the plurality of wind turbine generators of the wind power plant, determining through measurement a voltage measurement that is reflective of the grid voltage for the wind power plant grid;

providing to each wind turbine power controller a predetermined reference grid voltage that is reflective of a target voltage level for the wind power plant grid;

at each wind turbine generator of the plurality of wind turbine generators, comparing the voltage measurement that is reflective of the grid voltage for the wind power plant grid to the predetermined reference grid voltage to obtain a difference value; and using a proportional-integral or a proportional-integral-derivative controller to determine a variable current reference based on the difference value for each individual wind turbine generator for generating a varying reactive current from that respective wind turbine generator to contribute to the grid coupled with the wind power plant for regulating the grid voltage to achieve the predetermined reference grid voltage.

2. The method according to claim 1, wherein determining through measurement a voltage measurement that is reflective of the grid voltage comprises determining through measurement the grid voltage at a coupling of each of the plurality of wind turbine generators to the wind power plant.

3. The method according to claim 1, wherein the reactive current generated by each of the plurality of wind turbine generators is any one of an inductive reactive current and a capacitive reactive current.

4. The method according to claim 1, further comprising changing the wind power plant operational state from the fault recovery state to a normal operation state upon the satisfaction of an exit condition.

5. The method according to claim 4, wherein the exit condition is a predetermined fault recovery state time period.

6. The method according to claim 5, wherein the predetermined fault recovery state time period depends on the amount of time required for each of the plurality of wind turbine generators to change to the normal operation state and provide power accordingly.

7. The method according to claim 4, wherein the exit condition is based on the grid voltage satisfying a target reference voltage at a given tolerance for a predetermined period of time.

8. The method according to claim 7, wherein the target reference voltage is the predetermined reference grid voltage.

9. At least one computer program product directly loadable into the internal memory of at least one digital computer, comprising software code portions for performing the steps of the method according to claim 1 when said at least one product is/are run on said at least one computer.

10. A wind power plant comprising a plant controller, the plant controller comprising:
   a grid voltage sensor at a point of coupling to a power grid for a wind power plant, configured to detect a deviation in grid voltage for the wind power plant from a defined operation range, the deviation indicating a grid fault; and
   a state controller for the wind power plant configured to change a wind power plant operational state from a normal operation state to a fault ride through state upon indication of a grid fault, and to a fault recovery state for the wind power plant when the grid voltage returns to within the normal operation range; the wind power plant further comprising:
   a plurality of wind turbine generators, each of the plurality of wind turbine generators comprising:
   a wind turbine power controller, in communication with the plant controller, and configured to operate each of the plurality of wind turbine generators to carry out an independent fault recovery process at the direction of the plant controller through each of the plurality of wind turbine generators during the fault recovery state, the wind turbine power controller comprising:
   a turbine voltage sensor configured, for the respective wind turbine generator, to determine through measurement a voltage measurement that is reflective of the grid voltage for the wind power plant grid;
   a predetermined reference grid voltage that is provided at each wind turbine power controller and that is reflective of a target voltage level for the wind power plant grid;
   a summation module configured to compare the measured voltage measurement that is reflective of grid voltage for the wind power plant grid to the predetermined reference grid voltage to obtain a difference value; and
   a voltage control current reference module configured to use a proportional-integral or a proportional-integral-derivative controller to determine a variable current reference based on to the difference value for each individual wind turbine generator of the plurality of wind turbine generators to generate a varying reactive current from that wind turbine generator to contribute to the grid coupled with the wind power plant for regulating the grid voltage to achieve the predetermined reference grid voltage.

11. The wind power plant of claim 10, wherein the turbine voltage sensor is further configured to determine through measurement of a voltage measurement that is reflective of the grid voltage at a coupling of each of the plurality of wind turbine generators to the wind power plant.

12. The wind power plant of claim 10, wherein the reactive current generated by each of the plurality of wind turbine generators is any one of an inductive reactive current and a capacitive reactive current.

13. The wind power plant of claim 10, wherein the state controller is further configured to change the wind power plant operational state from the fault recovery state to a normal operation state upon the satisfaction of an exit condition.

14. The wind power plant of claim 13, wherein the exit condition is a predetermined fault recovery state time period.

15. The wind power plant of claim 14, wherein the predetermined fault recovery state time period depends on the amount of time required for each of the plurality of wind turbine generators to change to the normal operation state and provide power accordingly.

16. The wind power plant of claim 13, wherein the exit condition is based on the grid voltage satisfying a target reference voltage at a given tolerance for a predetermined period of time.

* * * * *